United States Patent
Cook et al.

(10) Patent No.: US 6,427,319 B1
(45) Date of Patent: Aug. 6, 2002

(54) METHOD FOR PROTECTING MAGNETIC READ/WRITE TRANSDUCERS AGAINST ELECTROSTATIC DISCHARGE DURING DISK DRIVE MANUFACTURING

(75) Inventors: Jack Dana Cook, Washington, UT (US); Grace Lim Gorman; Cherngye Hwang, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/570,620

(22) Filed: May 15, 2000

Related U.S. Application Data

(62) Division of application No. 09/132,734, filed on Aug. 12, 1998, now abandoned.

(51) Int. Cl.[7] ............................................. G11B 5/127
(52) U.S. Cl. ................... 29/603.12; 29/603.13; 29/603.14; 29/603.25; 360/323; 360/313; 360/324.12
(58) Field of Search ..................... 29/603.12, 603.13, 29/603.14, 603.15, 603.25; 360/323, 320, 313, 324.12; 216/22, 39, 49, 66; 204/202, 192.32, 192.11

(56) References Cited

U.S. PATENT DOCUMENTS

| | | | | |
|---|---|---|---|---|
| 4,351,698 A | * | 9/1982 | Osborne | 156/661.1 |
| 4,931,892 A | * | 6/1990 | Spada | 360/113 |
| 5,028,906 A | * | 7/1991 | Moriya et al. | 338/35 |
| 5,175,658 A | * | 12/1992 | Chang et al. | 360/103 |
| 5,654,850 A | * | 8/1997 | Ganapathi et al. | 360/103 |
| 5,804,085 A | * | 9/1998 | Wu et al. | 216/22 |
| 5,809,637 A | * | 9/1998 | Rottmayer | 29/603.15 |
| 5,916,423 A | * | 6/1999 | Westwood | 204/192.32 |
| 6,051,286 A | * | 4/2000 | Zhao et al. | 427/576 |
| 6,137,660 A | * | 10/2000 | Partee et al. | 360/313 |
| 6,160,687 A | * | 12/2000 | Pinarbasi | 360/322 |
| 6,246,553 B1 | * | 6/2001 | Biskeborn | 360/323 |

FOREIGN PATENT DOCUMENTS

JP   56-137516   * 10/1981

* cited by examiner

Primary Examiner—Peter Vo
Assistant Examiner—Minh Trinh
(74) Attorney, Agent, or Firm—Robert B. Martin; Bracewell & Patterson, L.L.P.

(57) ABSTRACT

A method for protecting magnetic read/write head assembly against electrostatic discharge during disk drive manufacturing are disclosed. The magnetic head assembly is supported on a substrate having a magnetoresistive sensor element disposed in spaced relationship between several magnetic shield elements. Before a focused ion beam fabrication operation, at least a portion of an air bearing surface of the magnetic head assembly is coated with a thin and transparent layer of conductive material. This layer of conductive material is subsequent removed after the focused ion beam fabrication operation.

6 Claims, 3 Drawing Sheets

METHOD FOR PROTECTING MAGNETIC READ/WRITE TRANSDUCERS AGAINST ELECTROSTATIC DISCHARGE DURING DISK DRIVE MANUFACTURING

This application is a divisional of application Ser. No. 09/132,734, filed Aug. 12, 1998, now abandoned.

BACKGROUND OF THE INVENTION

1. Technical Field

The present invention relates to a method and apparatus for manufacturing magnetic disk drives in general, and in particular to a method and apparatus for protecting read/write transducers during disk drive manufacturing. Still more particularly, the present invention relates to a method and apparatus for protecting magnetic read/write transducers having magnetoresistive read sensors against electrostatic discharge or electrical overstress during disk drive manufacturing and assembly.

2. Description of the Prior Art

Disk drives have been widely accepted as a cost effective form of data storage for a computer system. Within a disk drive, there is a magnetic recording medium, in the form of a disk, and a magnetic read/write transducer, commonly referred to as a read/write head. The read/write head is attached to, or formed integrally, with a slider that is suspended over the disk on a spring-loaded support arm known as an actuator arm. As the disk rotates at an operating speed, the moving air generated by the rotating disk in conjunction with the physical design of the slider operates to lift the read/write head, allowing the read/write head to glide or fly slightly above and over the surface of the disk on a cushion of air, commonly referred to as an air bearing. In other words, the disk rotates at high speed while the read/write head "flies" slightly above the surface of the rotating disk. The flying height of the read/write head over the disk surface, typically only a few microns, is primarily a function of the speed of disk rotation, the aerodynamic properties of the slider, and the force exerted by the spring-loaded actuator arm.

During the manufacturing of disk drives, a major problem encountered by magnetic read/write heads is the build-up of electrostatic charge on various elements of the heads. Electrostatic charge may be produced, for example, by the presence of certain plastic materials during assembly and subsequent handling of the heads. When electrostatic charge builds up, electrostatic discharge (ESD) may then occur across the edge of an insulating layer between magnetic pole tips and adjacent conductive layers that are exposed and positioned adjacent to the transducing gap at the air bearing surface facing the disk.

It is well-known in the art that magnetoresistive (MR) read sensors are typically utilized as read elements for magnetic read/write heads, especially in high-density disk drives. This is because MR read sensors generally provide a higher output signal than inductive read/write heads such that a higher signal-to-noise ratio for the recording channel and a higher areal density of recorded data on the magnetic disk can be achieved. However, when MR read sensors are exposed to ESD or electrical overstress (EOS) (i.e., a voltage or current input larger than the intended voltage or current under normal operating conditions), the MR read sensors tend to be more susceptible to damage than their inductive counterparts because of the relatively small physical sizes of the MR read sensors. For example, an MR read sensor used for extremely high recording densities typically has a cross-section of 100 Angstroms (Å) by 1.0 micrometers ($\mu$m) or smaller, and ESD of only a few volts across such a small resistor is sufficient to produce currents capable of severely damaging or destroying the MR read sensor. As a result, various kinds of ESD/EOS damage to MR read sensors have been found to occur during both manufacturing and processing, which poses serious problems in the manufacturing and handling of magnetic read/write heads incorporating MR read sensors. The degree of ESD/EOS damage experienced by an MR read sensor may vary significantly, from degraded head performances to contamination of the air bearing surface or generation of electrical short circuits, to a complete destruction of the MR read sensor via melting and evaporation. But regardless of its severity, such damage is undesirable.

In recent years, the industry has been using focused ion beam (FIB) pole-trim for inductive heads, and the same FIB technique is being pursued for processing MR read sensors. However, MR read sensors are generally very sensitive to the FIB fabrication process, especially during air bearing surface (ABS) patterning and pole tip trimming. In fact, a recent study reveals that FIB operations can severely damage MR read sensors due to ESD/EOS during ABS pole-trims. Consequently, it would be desirable to provide an improved method and apparatus for protecting read/write heads having an MR read sensor during processing and assembly.

SUMMARY OF THE INVENTION

In view of the foregoing, it is therefore an object of the present invention to provide an improved method and apparatus for manufacturing magnetic disk drives.

It is another object of the present invention to provide an improved method and apparatus for protecting read/write transducers during disk drive manufacturing.

It is yet another object of the present invention to provide an improved method and apparatus for protecting magnetic read/write transducers having magnetoresistive read sensors against electrostatic discharge or electrical overstress during disk drive manufacturing and assembly.

In accordance with a preferred embodiment of the present invention, a magnetic head assembly is supported on a substrate having a magnetoresistive sensor element disposed in spaced relationship between several magnetic shield elements. Before a focused ion beam fabrication operation, at least a portion of an air bearing surface of the magnetic head assembly is coated with a thin and transparent layer of conductive material. This layer of conductive material is subsequent removed after the focused ion beam fabrication operation.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
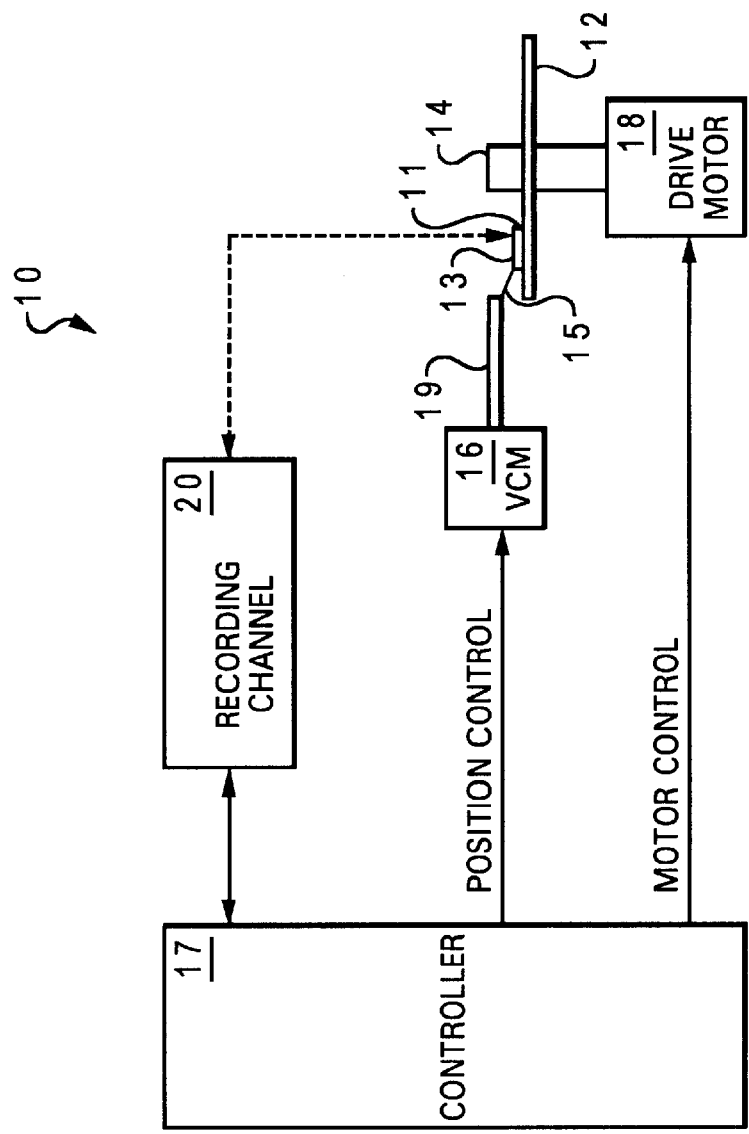
FIG. 1 is a block diagram of a magnetic disk storage system in which a preferred embodiment of the present invention is applicable.

Referring now to the drawings and in particular to FIG. 1, there is illustrated a block diagram of a magnetic disk storage system in which a preferred embodiment of the present invention is applicable. As shown, a magnetic disk storage system 10 comprises at least one rotatable magnetic disk 12 supported on a spindle 14 and rotated by a drive motor 18. A slider 13, positioned over disk 12, is utilized to support a magnetic read/write transducer, commonly referred to as a read/write head 11, for reading data from or writing data to disk 12. The magnetic recording media on disk 12 is in the form of an annular pattern of concentric data tracks (not shown). As disk 12 rotates, slider 13 is moved radially in and out over the surface of disk 12 so that read/write head 11 may access different portions of disk 12 where desired data is recorded. Slider 13 is attached to an actuator arm 19 by means of a suspension 15. Suspension 15 provides a slight spring force that can bias slider 13 against the surface of disk 12. During the operation of magnetic disk storage system 10, the rotation of disk 12 generates an air bearing between slider 13 and the surface of disk 12, which exerts an upward force or lift on slider 13. This air bearing counterbalances the slight spring force from suspension 15 and supports slider 13 off and slightly above the surface of disk 12 by a small, yet substantially constant spacing during the rotation.

In addition, actuator arm 19 is attached to an actuator means such as a voice coil motor (VCM) 16. VCM 16 typically includes a coil moveable within a fixed magnetic field, the direction and velocity of the coil movements being controlled by motor current signals supplied by a controller 17. Controller 17 may include, for example, a processor, storage means and logic control circuits. Controller 17 also generates different control signals to control various system operations. For example, a position control signal is utilized to provide the desired current profiles to optimally move and position a selected slider 13 to the desired data track on disk 12. Read and write signals are communicated to and from read/write head 11 by means of recording channel 20.

The above description of magnetic disk storage system 10 and the accompanying illustration of FIG. 1 are for representational purposes only. It should be apparent that magnetic disk storage systems may contain a large number of disks and actuators, and each actuator may support a number of sliders.

Figure 2:
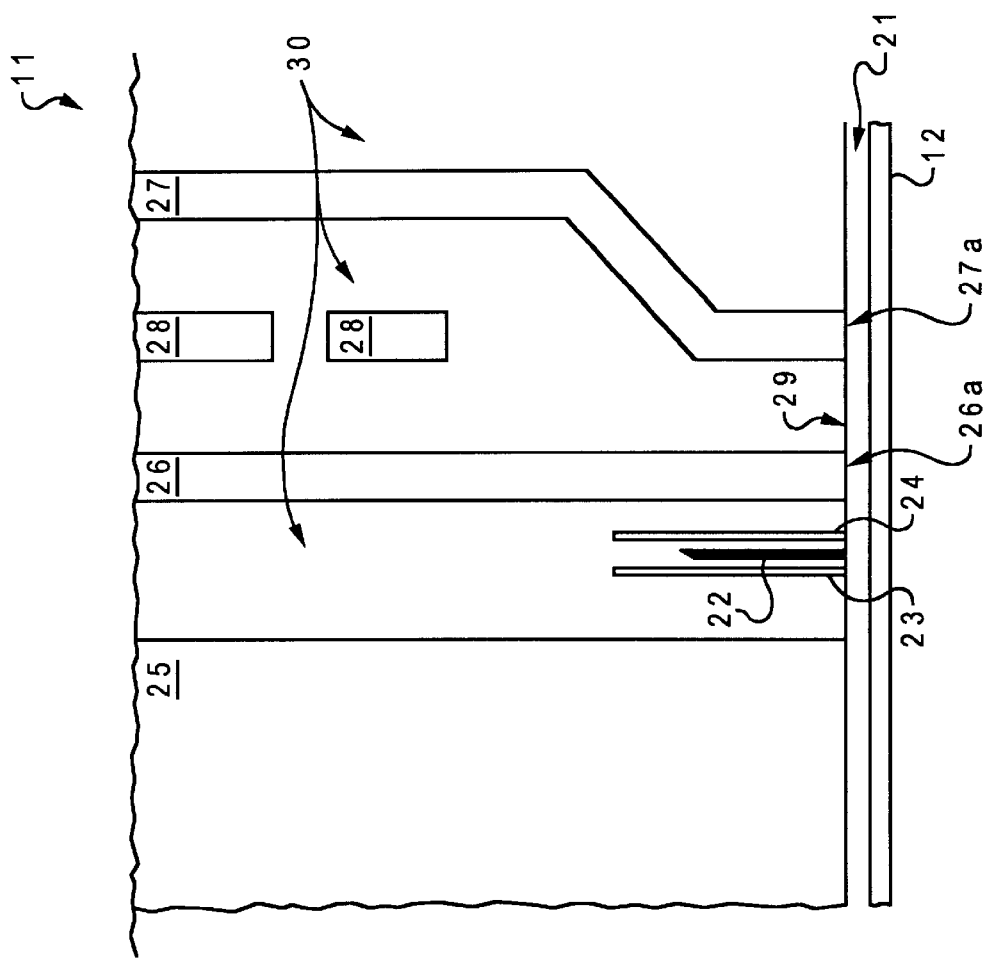
FIG. 2 is a diagram of a cross-sectional view of a read/write head in a transducing relationship with a rotating magnetic disk, in accordance with a preferred embodiment of the present invention.

With reference now to FIG. 2, there is illustrated a cross-sectional view of a read/write head 11 in a transducing relationship with a rotating magnetic disk 12, in accordance with a preferred embodiment of the present invention. As shown, an air bearing surface (ABS) 21 is disposed in facing relationship with and slightly above the surface of disk 12. Generally, head 11 includes an MR read assembly and an inductive write assembly formed adjacent to each another on a substrate surface 25. Substrate surface 25 is typically the vertical surface forming the trailing end of slider 13 (from FIG. 1) carrying head 11.

The MR read assembly comprises a MR sensing element 22 preferably fabricated with a ferromagnetic material such as a nickel-iron (NiFe) alloy. MR sensing element 22 may also include a single layer of NiFe, commonly referred to as Permally, but more typically, a multilayer magnetic structure, including magnetic bias layers. The MR read assembly is formed by vacuum deposition techniques, such as sputter deposition, on substrate 25. The various elements of the MR read assembly are surrounded and insulated from each other by an insulating material 30 such as silicon dioxide ($SiO_2$) or aluminum oxide ($Al_2O_3$). As shown, MR sensing element 22 is enclosed by a first shield element 23 and a second shield element 24. Shield elements 23, 24 are generally made of a highly permeable magnetic material, such as Permally, or a tri-alloy of aluminum-silicon-iron, such as Sendust. Shield elements 23, 24 minimize or even eliminate any magnetic interference that may induce MR sensing element 22 to produce extraneous electrical pulses. In addition, there are conductive leads (not shown), generally made of copper or other suitable conductive material, attached electrically at the end portions of MR sensing element 22 that couple MR sensing element 22 to external circuitry to provide a means for sensing the resistance of MR sensing element 22.

The inductive write assembly comprises a lower or first pole piece 26 and an upper or second pole piece 27, both made of a highly permeable magnetic material such as NiFe. First pole piece 26 and second pole piece 27 are magnetically connected together at a back gap portion (not shown) with a first pole tip 26a and a second pole tip 27a, respectively, to form a magnetic gap 29 above air bearing surface 21. One or more layers of electrical conductors 28, generally made of copper, are combined to form an inductive coil disposed between first and second pole pieces 26, 27. Electrical conductors 28 are also connected to external circuitry via conductive leads. Pole pieces 26, 27 and electrical conductors 28 are preferably fabricated by well-known processes such as electro-plating or sputter deposition. Pole pieces 26, 27 are insulated electrically from electrical conductors 28 and the MR read assembly by insulating material 30. Additionally, the entire head 11 is covered with a capping layer of insulating material 30 and various protective materials.

As mentioned in the background section of this disclosure, electrostatic charges may be built up on various components of head 11 by any object, equipment or person that comes into contact with or closely approaches head 11 during the manufacturing process and during subsequent handling of head 11. For example, the assembling of head 11 with other components to produce a disk drive assembly can result in relatively large amounts of electrostatic charges accumulating on head 11. These electrostatic charges can migrate from areas at which they are generated to other areas via all possible conductive paths. Thus, a subsequent build-up of electrostatic charges may result in a discharge from one conductive element across a dielectric, which experiences "breakdown," to another conductive element, in the manner of a capacitive discharge. The discharge typically causes damage by burnout, or the like, at the areas of the conductive material that act as terminals for the discharge of the stored static electrical energy.

More importantly, when an MR read assembly is exposed to ESD/EOS, the MR read assembly is more susceptible to damage than its inductive counterpart. In other words, while magnetic pole pieces 26, 27 and electrical conductors 28 can typically withstand relatively high voltages and currents, MR sensing element 22 is more sensitive to voltage and current overloads. For the type of MR read assembly shown in FIG. 2, it has been found that ESD/EOS damage commonly occurs along the sensing region of MR sensing element 22 when the accumulated electrostatic charges are discharged directly through MR sensing element 22. Such electrical discharges may or may not include discharges to shield elements 23, 24, first pole piece 26, or substrate 25 (i.e. the body of slider 13).

In order to improve the protection of a read/write head having an MR read assembly against ESD/EOS hazards during manufacturing and processing, in accordance with a preferred embodiment of the present invention, a conductive protection layer can be added to MR sensing element 22 so that MR sensing element 22 is shorted throughout the ABS patterning (pole-trim and slider) processes. This conductive protection layer has to be thin enough so that it is transparent to electron and/or ion beams. As a result, the image of the pole-tip is clearly visible during a focused ion beam (FIB) fabrication process with a reflected secondary ion beam microscope (SIM) or a secondary electron beam microscope (SEM). The FIB fabrication process is well-known to those skilled in the art. In addition, the conductive protection layer has to be removable, and the removal process cannot affect the structure of MR sensing element 22 physically (recession) and magnetically (Quasi and Mag test).

Figure 3:
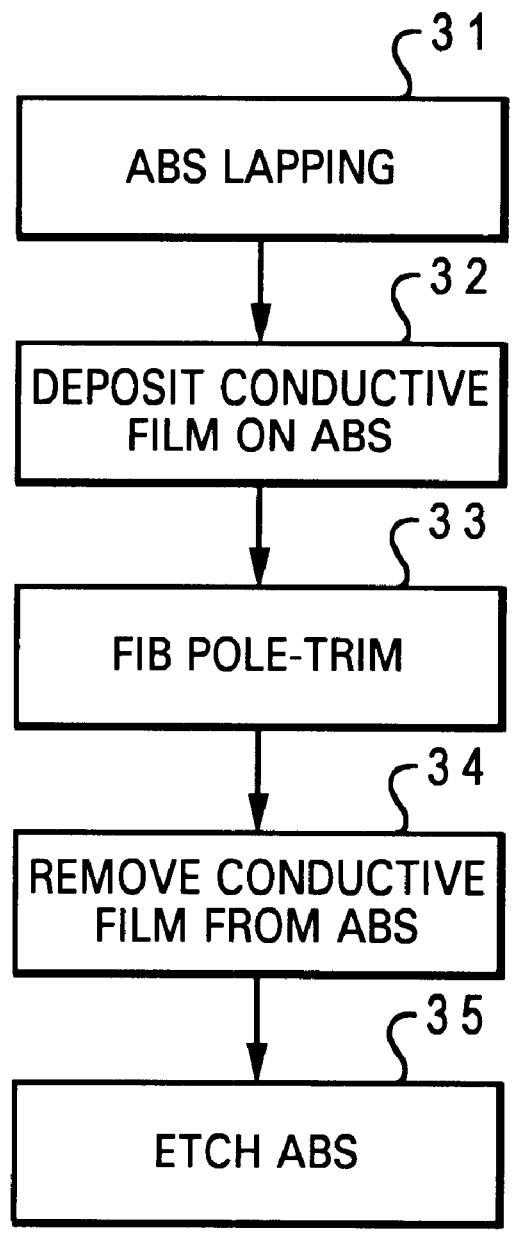
FIG. 3 is a high-level logic flow diagram illustrating a method for protecting a read/write head having a magnetoresistive read sensor against electrostatic discharge or electrical overstress during disk drive manufacturing and assembly, in accordance with a preferred embodiment of the present invention.

Referring now to FIG. 3, there is depicted a high-level flow diagram of a method for protecting a read/write head having a MR sensing element against ESD/EOS during disk drive manufacturing and assembly, in accordance with a preferred embodiment of the present invention. After ABS lapping has been performed on a row bar in which MR sensors are contained, as shown in block 31, a conductive film is deposited on the ABS of MR sensing elements, as depicted in block 32. FIB pole-trim is subsequently performed on the heads, as illustrated in block 33. Afterwards, the conductive film is removed from the ABS of the MR sensing elements, as shown in block 34. At this point, etching or other processing procedure can be performed on the ABS, as depicted in block 35.

The conductive film can be deposited on the ABS of the MR sensing elements by any of the deposition techniques known in the art, which include without limitation sputter deposition or vacuum deposition. As shown in FIG. 2, all of the head elements, with the exception of write head coils, are exposed to ABS 21. After the deposition, a layer of conductive film is formed over ABS 21, which electrically shorts all of the exposed head elements together. Specifically, the conductive film electrically shorts first shield element 23, MR sensing element 22, second shield element 24, MR leads, first inductive pole tip 26a, and second inductive pole tip 27a to each other and further to substrate 25. Thus, any electrostatic charge built up on these head elements will be discharged directly to substrate 25, shunting any current around MR sensing element 22. Although the coating of only ABS 21 is sufficient for the purpose of ESD/EOS protection for the head, it is preferable to coat the entire slider.

The material selected for the conductive film must be a good electrical conductor and must make reliable contacts to all the exposed head elements. The material must also be durable, adherent to the ABS material and immune to attack by subsequent manufacturing and assembly processes. In addition, the material must be removable without any adverse affect on head 11. According to a preferred embodiment, the conductive film is preferably a 50–350 Å thick layer of preferably Titanium (Ti) deposited over ABS 21 by sputter deposition. The conductive film is preferably formed as early as practical in the head manufacturing process in order to provide ESD/EOS protection for as much of the fabrication and assembly process as possible. In this preferred embodiment, the conductive film is deposited at the completion of the ABS lapping process prior to separating the individual heads/sliders from the wafer or row. Afterwards, the conductive film will be removed preferably as late as practical in the manufacturing and assembly process prior to the final customer level operating configuration of the disk drive assembly. For example, the conductive film may be removed once the head and its associated suspension means have been assembled into a head stack assembly (HSA) by dipping the head end of the HSA in a suitable oxiding etchant.

The Ti conductive film shorts the resistance of MR sensing element 22. However, because the film is so thin, the pole-image is still visible under secondary ion beam microscopy or secondary electron beam microscopy for the FIB operation. The Ti conductive film also prevents or minimizes sparkover damage and dielectric breakdown between the MR leads, first shield element 23, second shield element 24, first pole tip 26a, and substrate 25.

The resistance of MR sensing element 22 changes from approximately 47Ω (without the Ti conductive film) to 6–9Ω after deposition of the Ti conductive film. The 6–9Ω impedance is mainly attributed to the MR leads' resistance. Test data (human body model) shows that the failure voltage for MR sensor element 22 increased from approximately 100 volts without the Ti conductive film to approximately 3,000 volts with the Ti conductive film. In addition, the sparkover voltage increased from approximately 600 volts without the Ti conductive film to approximately 6,000 volts with the Ti conductive film.

The Ti conductive film may be removed by any suitable process, such as etching or laser oblation. As a preferred embodiment, a halogen gas, such as Fluorine, can be utilized in a plasma environment for removing the Ti conductive film. The Ti layer will be converted into $TiF_x$, and because $TiF_x$ is volatile at room temperature, it will subsequently evaporate into the atmosphere. Other removal processes such as utilizing a wet chemical etchant like $H_2O_2$ will also suffice. Since the removal process is very mild and gentle to the surface of the head, no recession is introduced, and the Quasi tests before and after the Ti coating should show no difference.

As has been described, the present invention provides an improved method and apparatus for protecting read/write transducers having an MR sensing element against ESD/EOS during processing and assembly. Specifically, a conductive transparent protection layer is added to the MR sensing element so that the MR sensing element is shorted throughout the ABS patterning (pole-trim and slider) processes. Although the invention is described as embodied in a magnetic disk storage system, it is understood that the present invention is also applicable to other magnetic recording systems such as a magnetic tape recording system, or other applications in which an MR sensing element is utilized to detect a magnetic field. The selection of Ti as the conductive protection layer is based on Ti's high conductivity, good adhesion and ease of removal. Similar materials, such as Molybdenum (Mo), Chromium (Cr), etc. and their alloys are also potential candidates for this kind of application.

While the invention has been particularly shown and described with reference to a preferred embodiment, it will be understood by those skilled in the art that various changes in form and detail may be made therein without departing from the spirit and scope of the invention.

What is claimed is:

1. A method for protecting a magnetoresistive sensing element within a magnetic head assembly from damage caused by electrostatic discharge or electrical overstress, said magnetic head assembly is supported on a substrate having said magnetoresistive sensing element disposed in spaced relationship between a plurality of magnetic shield elements, said method comprising the steps of:

coating said magnetoresistive sensing element and said plurality of magnetic shield elements with a layer of conductive film, said layer of conductive film being transparent to an ion beam or an electron beam, said layer of conductive film is Titanium; and subsequent to said coating step, performing a focused ion beam pole-trim operation on an air bearing surface of said magnetic head assembly.

2. The method according to claim 1, wherein said coating step further includes a step of sputter depositing said layer of conductive film.

3. The method according to claim 1, wherein said method further includes a step of removing said layer of conductive film, subsequent to said performing step.

4. The method according to claim 3, wherein said method further includes a step of etching said air bearing surface of said magnetic head assembly, subsequent to said removing step.

5. The method according to claim 1, wherein said layer of Titanium is approximately 50–350 Å thick.

6. The method according to claim 1, wherein said coating step further includes a step of coating an air bearing surface of said magnetoresistive sensing element.

* * * * *